July 17, 1956  A. W. GUSTAFSON  2,755,002
GRAIN DRILL
Filed May 18, 1953  2 Sheets-Sheet 1
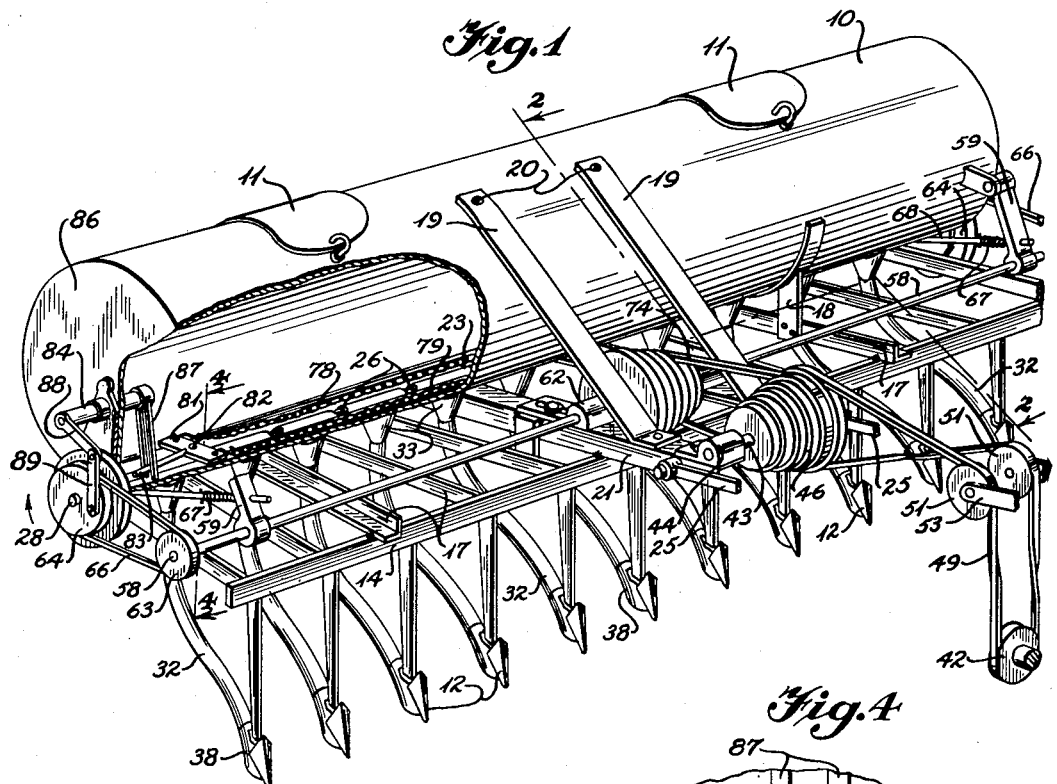
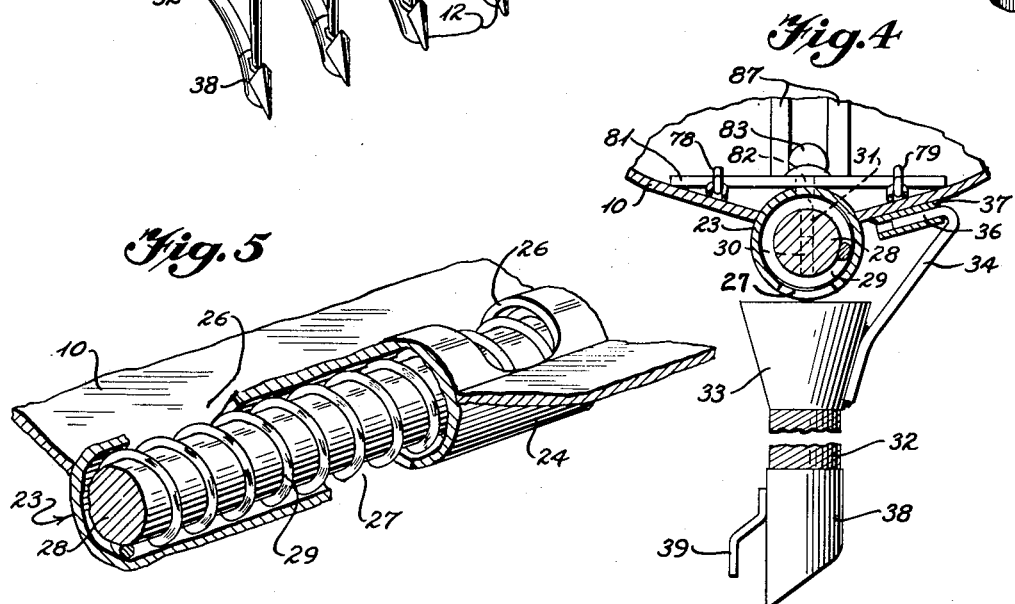
INVENTOR
August W. Gustafson
BY
ATTORNEY July 17, 1956  A. W. GUSTAFSON  2,755,002
GRAIN DRILL
Filed May 18, 1953  2 Sheets-Sheet 2
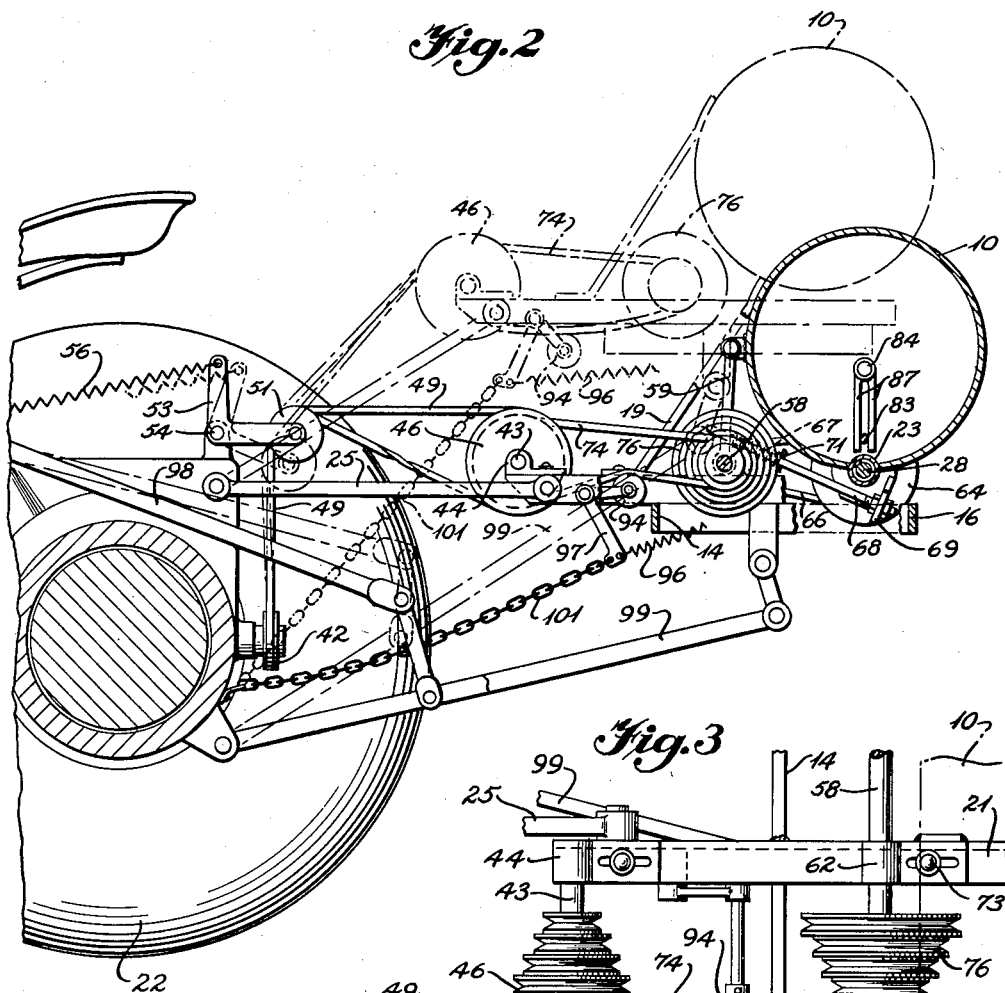
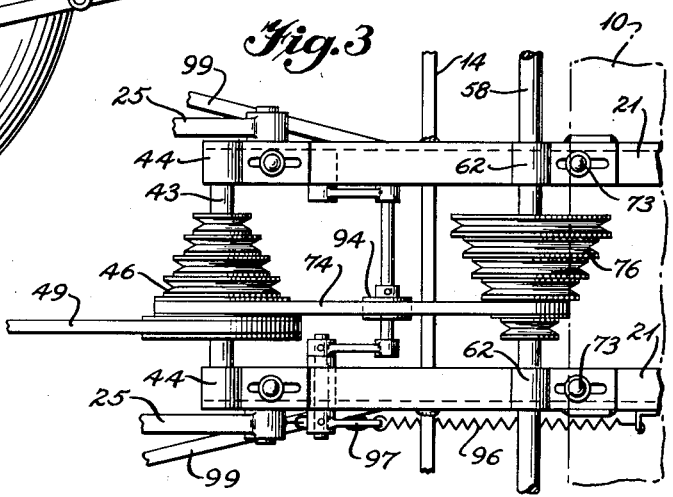
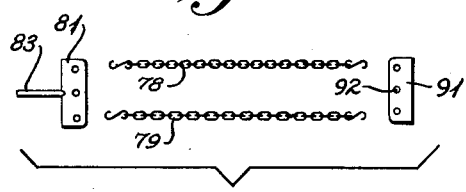
INVENTOR
August W. Gustafson
BY
ATTORNEY

United States Patent Office 2,755,002
Patented July 17, 1956

2,755,002

GRAIN DRILL

August W. Gustafson, Corpus Christi, Tex.

Application May 18, 1953, Serial No. 355,649

4 Claims. (Cl. 222—232)

The present invention relates generally to grain drills or apparatus for delivering seed in controlled quantities to small furrows and the invention more specifically pertains to seed handling equipment adapted for use in association with cultivators of various types.

An object of the invention is to provide a seed storage hopper and distributor mechanism which may be mounted on a cultivator or similar equipment drawn by a tractor and adapted to provide small furrows into which the seed is delivered and to thereby provide a grain sowing mechanism materially less costly than conventional grain drills.

Another object of the invention is to provide an elongated storage hopper which is adapted to extend transversely of the path in which it is moved including means in the lower portion of the drum for conveying the seed to the outlet openings including an improved mechanism for agitating the seed in the presence of discharge openings for the seed.

Other objects and features of the invention will be more apparent as the present disclosure proceeds and upon consideration of the following detailed description and the accompanying drawings wherein an exemplary embodiment of the invention is disclosed.

In the drawings:

Fig. 1 is a perspective view of a seed distributing mechanism exhibiting the invention shown in association with a cultivator and with parts broken away to illustrate features of the seed handling elements.

Fig. 2 is a sectional view taken on the line 2—2 of Fig. 1 and with portions of the cultivator omitted and showing the belt transmission drive in side elevation.

Fig. 3 is a fragmentary plan view showing a portion of the belt and pulley arrangement for driving the seed distributing mechanism.

Fig. 4 is a sectional view of a lower portion of the hopper taken on the line 4—4 of Fig. 1 and showing one of the tubes for receiving seed from an outlet opening in side elevation.

Fig. 5 is a fragmentary perspective view of a lower portion of the storage hopper with portions of the auger barrel in section.

Fig. 6 is a plan view of a portion of the agitating device.

Referring to the drawings there is shown at 10 a storage hopper for receiving a quantity of seed or grain. The storage hopper in the embodiment illustrated is formed as an elongated drum having such a length as to span the desired number of rows to be supplied with seed. The drum may be filled with seeds through openings in the upper portion thereof which are closed by doors 11.

In the embodiment illustrated in Fig. 1 the drum 10 is mounted on a cultivator having a plurality of furrow forming blades 12. The cultivating equipment may take any desired form and the frame of the cultivator provides a base for supporting the drum 10. The frame in the example shown includes a member 14 extending transversely of the cultivator. A similar frame member 16 extending parallel to the member 14 is shown in Fig. 2. A number of frame elements 17 are arranged at right angles to and supported on the frame members 14 and 16. A plurality of brackets one of which is shown at 18 are removably attached to the cultivator frame and support the drum 10 in a fixed position on the cultivator frame. The drum 10 may be further maintained in rigid relationship to the cultivator frame by means of straps 19 bolted to the drum at 20 and extending downwardly and forwardly therefrom and attached to additional frame elements 21. The cultivator frame may be coupled to a tractor 22 by means of links 25 so as to be moved forwardly by the tractor.

An auger barrel 23 is mounted in a lower portion of the drum 10 and extends lengthwise along a lower portion thereof. The auger barrel has a portion of its circumference arranged within the drum 10 and another and greater circumferential portion 24 positioned outside and below the circumference of the drum 10 as shown in Figs. 4 and 5. The auger barrel 23 is provided with a plurality of inlet openings 26 spaced at equal intervals along the length thereof. The seed stored within the drum 10 may enter the barrel 23 through the openings 26. An equal number of outlet openings 27 are provided in the lower portion 24 of the auger barrel 23 and one of such openings is shown in Fig. 5. The outlet openings 27 are displaced horizontally with respect to the inlet openings 26.

The discharge mechanism includes means for conveying the seed horizontally within the barrel 23 after it moves thereinto through the openings 26. Such means includes a shaft 28 extending throughout the length of the barrel 23. A helically disposed element 29 is arranged about the periphery of the shaft 28. This helical member 29 forms a thread-like rib on the periphery of the shaft 28 and during rotation thereof the helical element 29 conveys the seed axially within the barrel 23 for discharge through the outlet openings 27. The helical member is attached to the shaft 28 by having opposite ends thereof extend into radial openings as indicated at 30 and 31 in Fig. 4. The helical element 29 turns with the shaft 28 and serves as a worm arrangement.

A flexible tube 32 supported by a funnel 33 at the upper end thereof is mounted under each outlet opening 27. The funnel 33 with the tube 32 connected thereto is detachably supported on the drum 10 by means of individual brackets 34 having an angularly shaped end 36 which extends into one of the sockets 37 carried by the drum 10. The lower end of each tube 32 is provided with a sleeve 38 having a clip 39 thereon for holding the lower discharge end of the tube in a position to deliver seed into the furrow provided by the associated cultivating element 12. It will be appreciated that cultivating elements other than those illustrated at 12 may be provided for creating furrows into which the seed is delivered.

The seed handling mechanism is adapted to be driven by the power take-off of the tractor employed for pulling the cultivator. Such a power take-off is represented by the driven pulley 42 which is utilized to furnish a source of power for driving the shaft 28 and other elements of the seed delivery mechanism. A relatively short shaft 43 is mounted for rotation in bearings 44 secured to the frame members 21. A pulley 46 having a plurality of V-shaped grooves therein of different diameters is secured to the shaft 43. A belt 49 is trained about the power take-off pulley 42 and the pulley 46. Two idler pulleys 51 are so disposed as to cause the belt 49 to be maintained in operable relationship with respect to the pulleys 42 and 46. The idler pulleys 51 also serve to maintain the belt 49 under tension and it is for this purpose that each pulley 51 is mounted on a bell crank lever 53 which is pivotally mounted at 54 on a fixed part of the tractor. A spring 56 serves to turn the bell crank levers 53 in counterclockwise directions in Fig. 2 and thus maintain the belt 49 taut.

Another part of the transmission means includes a shaft 58 which is of such length as to extend beyond the ends of the drum 10. A pair of bearing brackets 59 are pivotally supported on the drum 10 and one is shown complete in Fig. 1 and serves as means for supporting one end of the shaft 58 for rotation. The other bearing bracket is provided adjacent the other end of the drum 10. The intermediate portion of the shaft 58 is supported for rotation by two bearings 62. A pulley is attached to the shaft 58 at each end thereof and one of such pulleys is shown at 63. A pulley 64 having a plurality of V-shaped grooves in the periphery thereof is secured to each end of the shaft 28. A belt 66 is trained about each pulley 58 and the associated pulley 64. The bearing brackets 59 are urged away from the bottom of the drum 10 by means of tensioning devices which include springs 67. Each spring 67 is mounted on a rod 68 which is secured at one end to a bracket 69 attached to the drum 10. Each spring 67 is compressed between its bearing brackets 59 and an abutment 71 on the rod 68. Thus the bearing brackets 59 are urged forwardly to maintain the belts 66 under tension. The intermediate bearings 62 are adjustably mounted on the frame members 21 by means of bolt and slot arrangements indicated at 73.

The power transmission arrangement includes a belt 74 trained about the pulley 46 and a pulley 76 secured to the shaft 58. The pulley 76 has a plurality of V-shaped grooves in the periphery thereof of different diameters. Thus the ratio at which the shaft 58 is turned with respect to the rotation of the shaft 43 may be varied by positioning the belt 74 in different grooves of the two pulleys 46 and 76. The shaft 58 transmits rotary movement to the shaft 28 through the belts 66 and the auger worm provided by the helical element 29 is thus rotated to convey seed within the auger barrel 23 to positions where it may escape through the outlet openings 27. The speed at which the auger worm is driven may be varied by changing the position of the belt 74 and by changing the position of the belts 66 in the grooves of the pulleys 64.

The grain drill includes means for agitating seed in the lower portion of the drum and in the presence of the auger barrel 23 to avoid arching of the seed which would tend to prevent delivery through the inlet openings 26. The agitating means includes two elongated flexible elements or chains 78 and 79. These chains extend lengthwise in the drum as shown in Fig. 1. The chain 78 is disposed at one side of the auger barrel 23 and the chain 79 is disposed at the other side of the auger barrel. The chains are connected to a cross bar 81 which is pivotally mounted at 82 on the auger barrel as shown in Figs. 1 and 4. An arm 83 extends laterally from the cross bar 81 and from the intermediate portion thereof as shown in Fig. 6. A short shaft 84 is journalled for rotation in the end wall 86 of the drum 10. A member having a pair of depending fingers 87 is carried by the inner end of the shaft 84 and the arm 83 is accommodated between these fingers. The outer end of the shaft is provided with a lever arm 88 which is connected to the pulley 64 by means of a link 89. Upon rotation of the pulley 64 the shaft 84 is oscillated back and forth to swing the fingers 87. The other end of the chains 78 and 79 are attached to a cross bar 91 which is mounted for pivoting movement at 92 on an upper portion of the auger barrel 23 adjacent the other end of the drum 10. As the cross bar 81 is oscillated about its pivot 82 the chains 78 and 79 are moved lengthwise within the barrel and shift the seed in the presence of the auger barrel 23 to facilitate movement of the seed through the inlet openings 26.

The power transmitting mechanism is so constructed and arranged that when the grain drill is lifted by elevation of the cultivator frame rotation of the shaft 58 is interrupted to thereby prevent delivery of the seed from the outlet openings 27. The horizontal displacement of the outlet openings 27 with respect to the inlet openings 26 is such that seed entering the auger tube 23 in the absence of rotation of the worm 29 will not escape through the outlet openings 27. Interruption of the driving of the distributing mechanism is made possible by relieving tension on the belt 74. An idler pulley 94 is urged into a position to tension the belt 74 by means of a spring 96. This spring turns the crank arms 97 and urges the idler pulley 94 to a position shown in full lines in Fig. 2. The cultivator frame carrying the drum 10 thereon is adapted to be lifted so that the cultivating elements 12 are raised above the soil engaging position by means of a lift mechanism carried by the tractor which includes links 98 and arms 99. As the cultivator is raised to a position shown in phantom lines in Fig. 2 a chain 101 attached to the tractor swings the crank arm 97 to a position to shift the idler pulley 94 away from the belt 74. The belt 74 without tension remains idle about the pulleys 46 and 76. Accordingly rotation of the auger worm is stopped and actuation of the agitating mechanism is interrupted when the grain drill is in the elevated position and distribution of the seed from the drum 10 is thereby interrupted. When the cultivator is lowered to an operative position the spring 96 again functions to tension the belt 74 and drive the shaft 58.

While the invention has been described with reference to specific structural features and with regard to one general organization it will be appreciated that changes may be made in the elements as well as the overall combination. Such modifications and others may be made without departing from the spirit and scope of the invention as set forth in the appended claims.

What I claim and desire to secure by Letters Patent is:

1. In a seed discharge mechanism, an elongated hopper, a cylindrical shaped barrel extending lengthwise of the hopper along a lower portion thereof, said barrel having inlet openings through which the seed may move from the hopper into the barrel, said barrel having discharge openings therein, means for moving the seed within the barrel for escape through the discharge openings, an elongated flexible element within the hopper extending lengthwise thereof along one side of said barrel, a second elongated flexible element within the hopper extending lengthwise thereof along the other side of the barrel, and means for alternately shifting said flexible elements in opposite directions lengthwise with respect to the barrel to agitate seed in the presence of said inlet openings.

2. In a seed discharge mechanism, an elongated drum, a cylindrical shaped barrel extending lengthwise of the drum along a lower portion thereof, said barrel having inlet openings through which the seed may move from the drum into the barrel, said barrel having discharge openings therein, means for moving the seed within the barrel for escape through the discharge openings, a chain within the drum extending lengthwise thereof along one side of said barrel, a second chain within the drum extending lengthwise thereof along the other side of the barrel, a shaft mounted for oscillation on the drum, means for oscillating said shaft, and means actuated by said shaft for alternately shifting said chains in opposite directions lengthwise with respect to the barrel to agitate seed in the presence of said inlet openings.

3. In a seed distributor mechanism, a storage hopper, an auger barrel within a bottom portion of said hopper having a plurality of inlet openings in an upper portion thereof for receiving seed from the hopper, said auger barrel having a plurality of spaced outlet openings in a lower portion thereof each horizontally displaced from an inlet opening, a shaft extending through the auger barrel, a helical member embracing the shaft, means securing ends of the helical member to said shaft, a pulley attached to each end of the shaft outside the hopper, a second shaft extending along the hopper and projecting beyond the ends thereof, a pulley attached to each end of the second shaft, belts trained about the pulleys of each end of the hopper, means for tensioning said belts, means for driving the second shaft to rotate the first shaft and the helical member to move the seed lengthwise in the auger barrel for escape through said outlet openings, a pair of chains within the drum extending lengthwise thereof along opposite sides of said barrel, a third shaft mounted for oscillation on the drum, means connected to one of the pulleys on the first shaft for oscillating said third shaft, and means actuated by the third shaft for moving one chain lengthwise of the drum in one direction and for moving the other chain in an opposite direction lengthwise of the drum.

4. In a seed discharge mechanism, an elongated storage hopper, a barrel carried by a lower portion of the hopper extending lengthwise thereof with a lower perimeter of the barrel exposed below the hopper, said barrel having inlet openings through which seed may pass from the hopper into the barrel, said barrel having a plurality of outlet openings in the lower portion thereof each horizontally displaced from one of said inlet openings, means within the barrel for moving seed axially therein for discharge through said outlet openings, an elongated flexible element within the hopper extending lengthwise thereof adjacent said inlet openings, a second elongated flexible element within the hopper extending lengthwise thereof adjacent said inlet openings, a bar pivotally mounted at its intermediate portion on said barrel adjacent one end of the hopper, means connecting one end of the first flexible element to an end of said bar, means connecting an end of the second flexible element to the other end of said bar, a cross bar pivotally mounted at its intermediate portion on said barrel adjacent the other end of the hopper, means connecting the other end of the first flexible element to one end of said cross bar, means connecting the other end of the second flexible element to the other end of said cross bar, and means for swinging said cross bar about its pivot to move the flexible elements lengthwise of the hopper in opposite directions.

References Cited in the file of this patent
UNITED STATES PATENTS

| | | |
|---|---|---|
| 1,664,078 | Lavery | Mar. 27, 1928 |
| 2,522,693 | Stiteler | Sept. 19, 1950 |
| 2,575,985 | Thompson | Nov. 20, 1951 |